April 16, 1940.  L. M. CLARK  2,197,030

CUSHIONING MECHANISM

Filed June 28, 1939  5 Sheets-Sheet 1

INVENTOR
Leverett M. Clark
BY
ATTORNEYS

April 16, 1940.  L. M. CLARK  2,197,030
CUSHIONING MECHANISM
Filed June 28, 1939  5 Sheets-Sheet 2

Patented Apr. 16, 1940

2,197,030

UNITED STATES PATENT OFFICE 2,197,030

CUSHIONING MECHANISM

Leverett M. Clark, Snyder, N. Y., assignor to Waugh Equipment Company, New York, N. Y., a corporation of Maine Application June 28, 1939, Serial No. 281,591

13 Claims. (Cl. 213—46)

This invention relates to coupling and draft mechanisms for use on railway vehicles, such as cars or motive power units, and is concerned more particularly with a novel apparatus for connecting together the units of a train, which is superior to those of the type heretofore in common use in that it operates more smoothly and, under normal operating conditions, provides a continuous cushioning action which prevents the transmission of shocks and jars to car structures. The new apparatus may be employed with suitable changes, necessary to meet different conditions of operation, on vehicles for either freight or passenger service, but for purposes of explanation, an embodiment of the invention suitable for use on cars of the freight type will be described in detail. It is to be understood, however, and will be apparent that the utility of the invention is not restricted to its use on railway vehicles of any particular type, capacity, or size.

In the operation of trains, the units of which are equipped with connecting mechanisms of the type now commonly in use, it is well known that the connections, which include couplers, draft gears, draft gear pockets, and associated parts, do not provide a continuous cushioning action, and that free slack develops in the connections. As a consequence, the parts of the connections are frequently permitted to have a relative movement, which is uncushioned and uncontrolled, and this causes shocks and jars to be transmitted from the couplers to the car structures, and results in discomfort to the passengers, damage to the lading, and, on frequent occasions, injuries to the equipment. The inability of the mechanism to prevent the transmission of such forces to the car bodies and lading is either inherent in the construction or assembly of the various parts of the mechanism, or the result of wear, breakage, or misalignment of parts, or arises from a combination of both causes. For these reasons, the objectionable results referred to occur even when the motive power of the train is handled most carefully by skilled operators, and although the shocks transmitted are most intense when the train is being started and stopped and when the train "consist" is being altered, they also take place when the train is running at relatively uniform speeds between station stops, as a result of undulations or irregularities in the track surface, variations in resistance and in the power output from the motive power unit, oscillations and vibrations from the motive power unit, and other causes.

The faulty operation of the prior connecting mechanisms arises in part from the development of free slack therein, and the amount of free slack present in the connections has a tendency constantly to increase or decrease lengthwise of the train. Such slack develops even though the connections are made of new and well designed devices, and there is no slack in the couplers, yokes, draft gears, draft gear pockets, and related devices when the parts are in normal condition and not subjected to such forces as applied during operation. The reason for this is that the connecting devices heretofore used are so constructed that the forces applied to the couplers during operation are transmitted to the car structures through draft gears or shock absorbing devices by means of contacting metallic parts, and when the draft gears are subjected to forces transmitted from the couplers, spaces develop in the connections. Then, upon removal or reversal of such forces, the spaces so created constitute free slack and permit uncontrolled and uncushioned relative movement of the parts which produces the objectionable results above mentioned.

In the case of an ordinary friction draft gear connected to a coupler by the usual vertical yoke, upon the application of a force in buff to the coupler, the rear end of the draft gear is held stationery by the rear draft gear stops in the draft pocket, and when the draft force exceeds the initial compression of the gear, the coupler moves back with its rear end bearing against the forward end of the draft gear. The gear is thus compressed and its length is shortened, and as the rear end of the yoke continues back while the rear end of the draft gear is held stationary, a space develops between the rear end of the yoke and the rear end of the gear, and a corresponding space develops between the forward end of the draft gear and the forward draft gear stops. If, with the mechanism in this condition, the force in buff ceases or is changed suddenly to one in draft, the coupler yoke moves forward, and this movement is uncushioned and uncontrolled until the rear portion of the yoke has again engaged the rear end of the draft gear and the forward end of the draft gear has engaged the forward draft gear stops. A similar sequence of events takes place when an initial force in draft ceases or is changed to one in buff and the magnitude of the uncontrolled movement, resulting from the spaces between the parts of the apparatus produced as described, but in the inverse manner, depends on the magnitude of the force originally applied to the mechanism and producing the spaces referred to. In all cases, however, the development of the spaces or free slack causes dynamic shocks and disturbances which may be of considerable intensity, particularly when a substantial force applied to the coupler in one direction changes suddenly to a substantial force applied in the opposite direction. As the direction of the forces applied to the connecting mechanism in a train varies almost constantly during operation, slack is always present to a greater or less degree in connections made up of apparatus as now commonly used, and when a heavy train is being started or stopped, the slack is likely to be such that the car structures are subjected to dynamic shocks of great severity.

The present invention is directed to the provision of a novel apparatus for use on railway vehicles for connecting together the units of a train, which is so constructed that, under normal operating conditions, it provides a continuous cushioning action and thus prevents uncushioned and uncontrolled relative movement of the parts of the apparatus, with the objectionable results above referred to. The new apparatus is also of such construction that it can be installed in a standard draft pocket on a railway vehicle, and the parts of the new mechanism can be assembled in advance to produce a unit which can be quickly and easily placed in position in the pocket.

The new cushioning apparatus includes a pair of cushioning elements or units mounted in line in a yoke of novel construction which encircles the units and includes side pieces, one of which may support the units, end members connecting the side pieces and lying out of contact with the units, and an intermediate member or cross-bar which lies between and in contact with the adjacent ends of the units. This assembly is installed as a unit in a draft pocket, and when in operation condition, the remote ends of the units bear against the usual draft stops at the ends of the pocket.

The cushioning units of the new mechanism may be of various constructions, as, for example, they may resemble friction draft gears which include friction elements in the form of wedges, shoes, or the like acted on by springs, or they may consist of springs or combinations of plate and coil springs, etc. Cushioning elements which include resilient material such as rubber compounds are preferred, and the cushioning units used are also preferably installed in the draft pocket under such effective compression that each unit has an expansivity equal to the amplitude of movement of the yoke against the resistance of the other unit, under normal operating conditions. Under such conditions, upon the movement of the yoke by a force applied to the coupler, the crossbar of the yoke compresses one unit between it and the draft stops, and the other unit expands by an equal amount. Continuous contacts are thus maintained between the ends of the unit, the yoke crossbar, and the draft stops, and, under normal conditions of operation, no spaces develop in the connections between the yoke and the car structure. Accordingly, when a force applied to the coupler, which has resulted in the compression of one of the units, is removed or changes to a force in the opposite direction, the return movement of the yoke is immediately cushioned and controlled by the previously expanded unit, and the transmission of shocks and jars to the car structure is thus avoided.

To facilitate the mounting of the new apparatus in a standard draft pocket, particularly with the units under the relatively high effective compression above referred to, the units are placed in the new yoke and compressed against the crossbar of the latter until the overall length of the units plus the thickness of the crossbar is less than the distance between the draft stops in the pocket. With the units in this condition, temporary holding means are inserted between the remote ends of the units and the ends of the yoke and act to maintain the units under the desired compression. The assembly is then installed in the pocket from beneath in the usual way, and as soon as forces have been applied to the coupler which produce further compression of the units, the temporary holding means drop out of place and thus permit the units to engage the draft stops after removal of the forces. By assembling the parts of the mechanism in this manner prior to its installation in the draft pocket, the compression under which the units are placed to cause them to function in the manner described, can be applied by suitable apparatus for the purpose, and difficulties which might otherwise be encountered in installing the units in the pocket under the relatively high effective compression are avoided.

For a better understanding of the invention, reference may be made to the accompanying drawings in which:

Fig. 16 is a sectional view of a plate used in a cushioning unit in connection with the element shown in Fig. 14;

Figure 1:
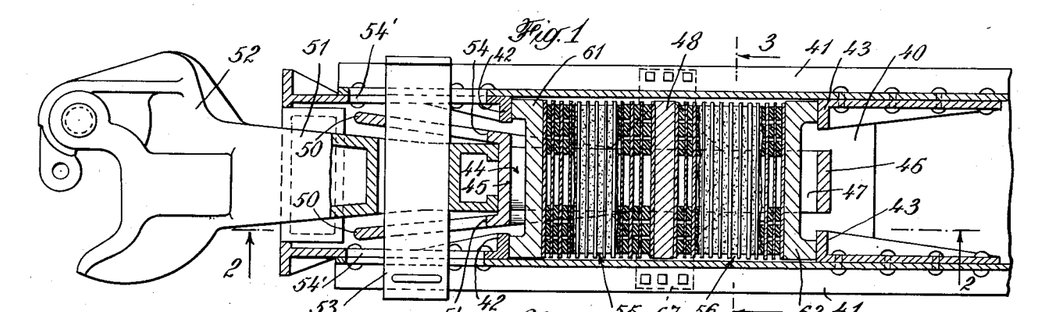
Fig. 1 is a longitudinal cross-sectional view on the line 1—1 of Fig. 2, with parts shown in plan and illustrating one form of the cushioning mechanism of the invention installed in the draft pocket of a railway vehicle.

In the construction illustrated in Fig. 1, the mechanism of the invention is shown installed in a standard draft pocket 40 which lies between longitudinal sills 41, 41 of the car, although, if desired, this pocket may be formed in any other manner. At the ends of the pocket are the usual front and rear draft stops 42, 43, respectively, these stops being attached to the sills in the usual way, as by riveting. The cushioning mechanism includes a vertical yoke 44 (Fig. 4) which includes front and rear end members 45, 46, respectively, and side pieces 47, the latter being connected by an intermediate member or crossbar 48. The side pieces, which in the case of a vertical yoke, lie at the top and bottom of the pocket, and the end members are relatively narrow as compared to the distance between the sills 41, but the cross-bar is of only slightly less width than the spacing between the sills. Those portions of the crossbar which project beyond the side pieces of the yoke are, therefore, preferably strengthened and supported, as by means of webs 49 extending from the side edges of the top and bottom pieces 47 to the projecting portions of the crossbar. At its forward end, the yoke is provided with spaced arms 50 between which is received the shank 51 of a coupler 52, the rear end of the shank bearing against the forward face of the end member 45 of the yoke. The shank is secured to the arms 50 in any suitable way, as by means of a key 53 which passes through a slot in the shank, through slots 54 in the arms 50, and through slots 54' in the sills, the latter being of considerable length so as to permit the key to have a substantial movement in a direction lengthwise of the car.

Figures 14, 15:
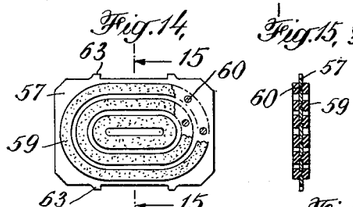
Fig. 14 is a face view, with parts broken away, of one of the elements of a cushioning unit which can be used in the new apparatus.
Fig. 15 is a sectional view on the line 15—15 of Fig. 14.

Within the yoke and encircled thereby are two cushioning units generally designated 55, 56. These cushioning units may be of various constructions, as previously described, but in the construction illustrated, each unit includes a plurality of metallic plates 57 carrying masses of resilient material, such as a rubber compound, separated by flat metallic plates 58 (Figs. 14–16). Each plate 57 carries masses of rubber mounted on its opposite faces in any desired manner, as, for example, a plurality of concentric rings of rubber 59 may be secured on each face of the plate 57 by tongues of rubber 60 which pass through openings in the plate and connect corresponding rings on opposite faces thereof. At their adjacent ends, the end separator plates 58 of the units bear against opposite faces of the crossbar 48, and at their remote ends, the units are provided with front and rear followers 61, 62, respectively, which engage the draft stops 42, 43. These followers may be of U-shaped cross-section as shown and have the ends of their legs bearing against the stops. If desired, the units may also include followers contacting with the crossbar 48 and protecting the end rubber-bearing or separator plates from contact with rough spots on the crossbar.

Figure 17:
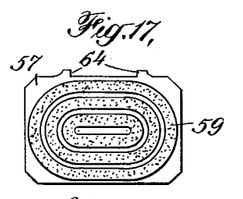
Figs. 17 and 18 are face views of modified forms of a cushioning element.
Figure 18:
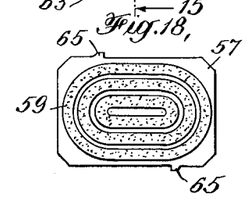
Figures 19, 20:
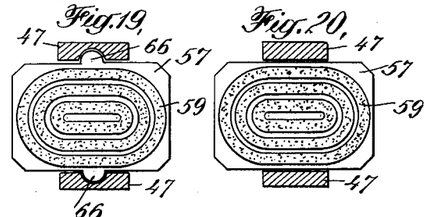
Figs. 19 and 20 are sectional views through a yoke, showing different forms of cushioning elements in place therein.

The units may be supported on the bottom piece 47 of the yoke and, preferably, the units are interlocked to the yoke against lateral movement relative thereto. For this purpose, each of the rubber-bearing and separator plates may be formed with pairs of spaced lugs 63 at the top and bottom edges thereof, these lugs projecting above and below the upper and lower faces of the top and bottom pieces of the yoke. If desired, the plates may be provided with only a single pair of lugs 64 placed at either the top or bottom of the plates, as shown in Fig. 17, or one lug 65 may be formed on the top of each plate at one side of the top or bottom piece and the other lug 65 may be formed at the bottom of the plate at the other side of the other piece of the yoke. Instead of providing plates with lugs which are adapted to engage the outer faces of the parts of the yoke, the plates may be formed with central lugs 66 seated in suitable channels formed in the top or bottom pieces 47, and various other means for effecting the interlock between the plates and yoke will suggest themselves.

Figures 6, 7:
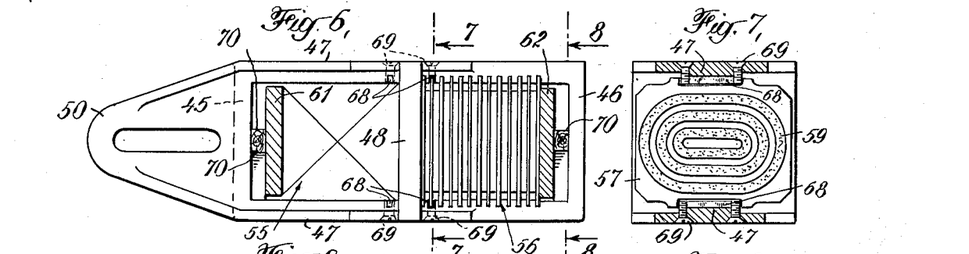
Fig. 6 is a view of the yoke in side elevation.
Figs. 7 and 8 are sectional views on the lines 7—7 and 8—8, respectively, of Fig. 6.

The new yoke 44 with the cushioning units, including the rubber-bearing and separator plates and the follower blocks, may be assembled as a unit which can be installed in a draft pocket on a railway vehicle to be held in place therein by the usual bottom plate 67 which is secured to the sills 41 by bolts or rivets. If the plates 57 and 58 of the units are not interlocked with the top and bottom pieces of the yoke, the installation unit is assembled by first placing a follower block in position and moving it outward against the end piece of the yoke, after which the plates are slipped edgewise into place between the follower block and the yoke crossbar, these operations being repeated for the other cushioning unit. If plates which interlock with the yoke are employed, it may be desirable to provide means to facilitate the assembly, as, for example, the top and bottom pieces of the yoke may be transversely slotted on their inner surfaces at points near the crossbar, as indicated at 68, Fig. 6. These slots are of sufficient depth to receive the lugs on the plates and the plates are inserted in the slots and moved transversely of the yoke until the lugs lie in proper relation to the top and bottom pieces, after which the plates are advanced toward the follower blocks at the ends of the yoke. After the total number of plates of the unit have thus been assembled, the slots may be closed in any desired way, as by screws 69, threaded into the yoke and closing the ends of the slots, so as to prevent dislodgment of the plates.

Figure 8:
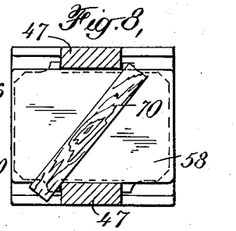
Figure 9:
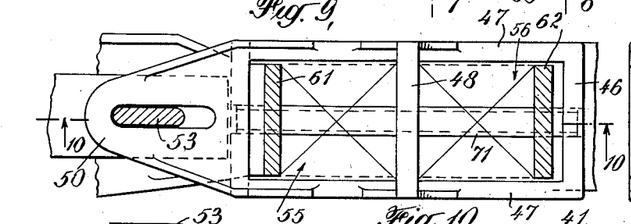
Fig. 9 is a view in side elevation of a modified yoke construction.
Figure 10:
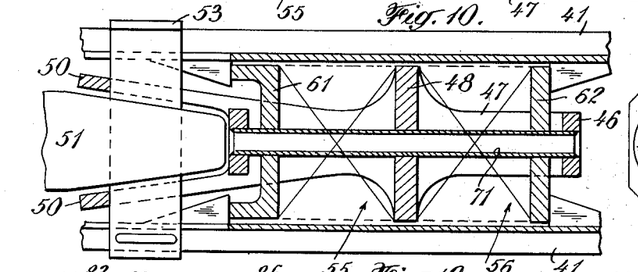
Fig. 10 is a sectional view on the line 10—10 of Fig. 9.

In the installed apparatus, the follower blocks of the units are forced against the draft stops by the resilient material and this original compression of the units may be relatively small and merely sufficient to insure a workmanlike fit of the parts, or the effective compression under which the units are installed may be considerable so as to insure that the units will have such an expansibility as to cause continuous contacts to be maintained between the ends of each unit and the yoke crossbar and draft stops, respectively, under all normal operating conditions. In standard railway rolling stock, the draft pockets have certain definite lengths, such, for example, as 24⅝", and it is, therefore, desirable, in order to facilitate installation in such equipment, that the cushioning units be initially compressed to such an extent that their overall length plus the thickness of the yoke crossbar is less than the length of the pocket in which they are to be installed. For this and other purposes to be described, the yoke is provided with the rear end piece 46, and after the introduction of the units in the yoke, each unit is compressed against the crossbar by suitable apparatus, and temporary holding means, such as bars of wood 70, are inserted between the front follower 61 and the front end member 45 of the yoke, and between the rear follower block 62 and the rear end member 46 of the yoke. Preferably, these bars of wood are installed in a diagonal position as indicated in Fig. 8, and the assembly of the yoke, cushioning units, and temporary holding means forms a unit which is highly convenient for shipping and installation purposes.

The installation assembly is placed in the draft pocket by raising it from beneath into the space between the sills and between the stops and, when the assembly is in place, the follower blocks lie a short distance inward from the draft stops. The cross support 67 is then placed in position to hold the assembly in place and the coupler is connected to the arms of the yoke by the key 53. Thereafter, as soon as a force in buff sufficient to cause compression of the rear unit 56 is applied to the coupler and the yoke is moved back, the rear follower 62 of the unit engages the rear draft stops 43, and the rear end piece 46 of the yoke releases the temporary holding means in contact therewith, and the latter drops out. Similarly, when a force in draft is applied to the coupler, the front follower 61 engages the draft stops 42, and as the yoke moves forward, the front end piece 45 releases the bar 70 previously in contact therewith and the bar balls out of the pocket. The cushioning apparatus is then in condition for normal operation.

Figure 11:
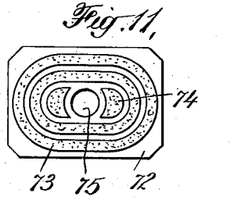
Fig. 11 is a face view of one element of a cushioning unit employed with the yoke illustrated in Fig. 9.

Instead of preventing lateral displacement of the rubber-bearing and spacer plates 57, 58, respectively, by interlocking these plates by means of lugs with the side pieces on the yoke, the same result may be accomplished by the use of a central guide rod 71, which may have its ends mounted in suitable apertures in the front and rear end pieces of the yoke and passes through similar apertures in the front and rear follower blocks 61, 62, the yoke crossbar 48, and the rubber-bearing and spacer plates of which the cushioning units are composed. In this instance, each rubber-bearing plate may be of the form illustrated at 72, Fig. 11, the plate being provided with a pair of concentric rings of rubber 73 on its opposite faces and having generally semi-circular blocks 74 within the rings and at opposite sides of the aperture 75.

Figure 12:
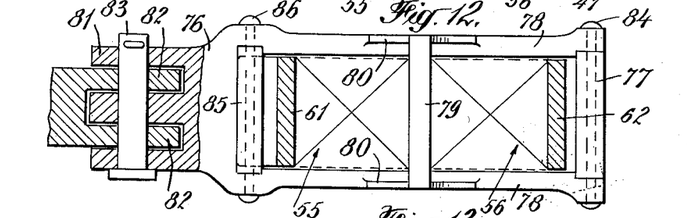
Fig. 12 is a view in side elevation and partly in section, of a modified yoke construction.
Figure 13:
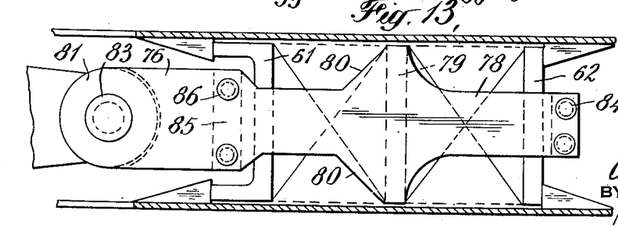
Fig. 13 is a plan view of the yoke shown in Fig. 12.

When the coupler is of the swivel construction, a yoke of the type illustrated in Figs. 12 and 13 may be employed, this yoke including front and rear end members 76, 77, top and bottom pieces 78, and a crossbar 79 having its projecting portions strengthened by webs 80. The front end member 76 is provided with rojecting tongues 81 between which are received the tongues 82 of the coupler shank, the tongues on the yoke and shank being pivotally connected by a pin 83.

In the yoke shown in Fig. 12, the rear end member 77 is separate from the top and bottom pieces 78 and is held in place by a bolt 84 or the like passing through openings in the top and bottom pieces and end member. Similarly, the front end member includes a separate block 85 held in place by a bolt 86. The end member 77 and block 85 are preferably of slightly greater length than the distance between the top and bottom pieces throughout the major portions of the length of the latter, and the end member 77 and block 85 are seated in recesses in the top and bottom pieces, as shown. The use of the removable end member and block facilitates the assembly of the units when plates interlocking with the yoke are employed, and these features may be used, if desired, in other types of yoke, such as that shown in Figs. 1 and 2.

The rear end member of the yoke not only serves as a connection between the top and bottom pieces of the yoke at the rear end thereof, and facilitates the use of the temporary holding means 70 previously described, but also serves as a means by which the yoke can be connected to a cushioning element behind the car frame bolster.

Figure 21:
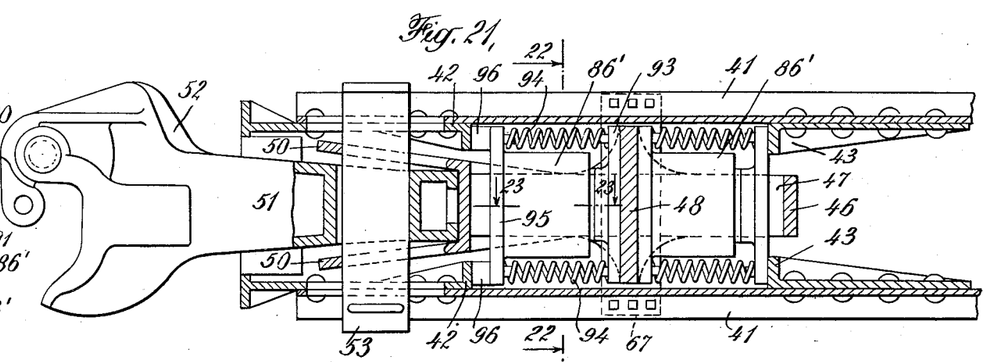
Fig. 21 is a view similar to Fig. 1, showing apparatus of the invention in which the cushioning units are of the friction type.
Figure 22:
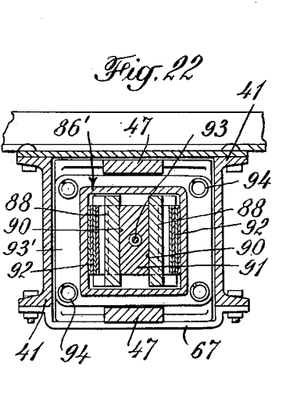
Figs. 22 and 23 are sectional views on the lines 22 and 23, respectively, of Fig. 21.
Figure 23:
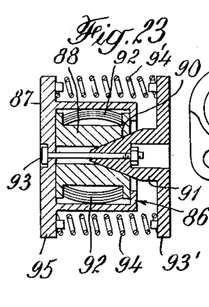

In the construction shown in Fig. 21, the cushioning units 86' are of the friction type, each unit consisting of a housing 87 containing shoes 88 having inclined surfaces bearing on inclined friction surfaces 90 on a plunger 91 which enters the housing with its inner end lying between the shoes. The friction surfaces on the shoes and plunger are forced into contact by bundles of leaf springs 92 bearing against the inner wall of the housing and the individual shoes, and the movement of the plunger away from the housing is limited by a bolt 93 which passes through the end wall of the housing and into a recess in the plunger. At the end lying outside the housing, the plunger is provided with a flange 93', and a plurality of release springs 94 are mounted to bear against the flange 93' on the plunger and a flange 95 on the housing.

In the complete cushioning apparatus, the two cushioning units are mounted under compression in the yoke with their adjacent ends bearing against the crossbar 48. The rear end of the rear unit then bears against the rear draft stops 43 and the forward end of the front unit bears against blocks 96 interposed between the end of the unit and the draft stops 42. The blocks 96 may be either secured to the stops 42 or to the sills 41, or they may be secured to or formed as parts of the cushioning unit.

Figures 2, 3, 4, 5:
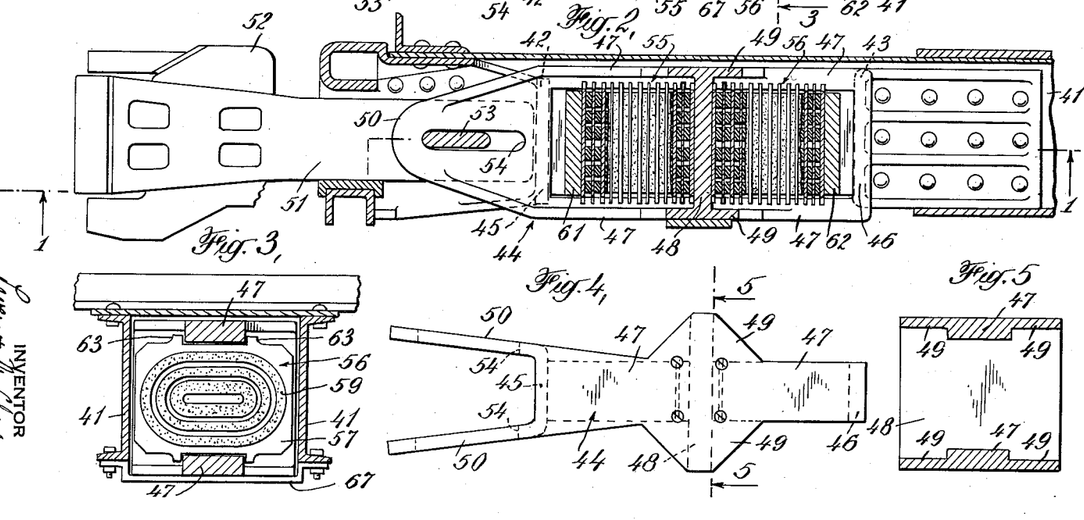
Figs. 2 and 3 are sectional views on the lines 2—2 and 3—3, respectively, of Fig. 1.
Fig. 4 is a plan view of the yoke employed in the construction shown in Fig. 1.
Fig. 5 is a sectional view on the line 5—5 of Fig. 4.

In the operation of the apparatus as shown, for example, in Figs. 1 and 2, on the application to the coupler of a force in buff, the yoke moves back and in this movement, the crossbar 48 compresses the rear unit 56 against the rear draft stops 43. The front end member 45 and the yoke is, as illustrated, spaced a considerable distance from the front follower block 61, and this distance is such that, under normal conditions of operation, the end member does not contact with the follower block. If the units are installed under relatively light compression sufficient only to insure workmanlike fit of the parts, on compression of the rear unit, the forward unit expands slightly, and if the force in buff is considerable, the plates of the unit may ultimately lie only in light contact. However, when the force in buff is removed, or converted into a force in draft, the yoke moves forward, and although its movement may be temporarily unresisted, the crossbar quickly forces the plates of the cushioning unit into tight contact and begins to compress the rubber masses so that further forward movement of the yoke is cushioned and controlled. If the units are installed under a substantial effective compression above referred to, as one unit is compressed, the other expands by an equivalent amount, so that each unit maintains a continuous close contact at one end with its draft stops and at the other end with the yoke crossbar. Under those conditions, return movement of the yoke is resisted and cushioned by the previously expanded unit and this cushioning action takes effect immediately upon reversal of movement of the yoke. With the units under either degree of compression, the yoke movement is cushioned and controlled and no spaced metallic parts move into contact during the operation of the mechanism. Accordingly, the transmission of shocks and jars from the coupler to the car structure is wholly prevented.

The operation of the device illustrated in Fig. 21 is generally similar to that shown in Fig. 1, and as before, it is preferred to install the cushioning units under a relatively high effective compression so that each unit may make continuous contact at one end with the crossbar of the yoke, and at the other with a rigid part of the car structure. With this arrangement, the development of free slack between the coupler and car structure is prevented.

By the use of the new yoke, it is possible to assemble the cushioning units in the yoke, place them under the desired degree of compression necessary for easy installation in a standard draft pocket, and maintain the units in this condition by the temporary holding means, which automatically drop out upon initial operations of the apparatus in opposite directions. The assembly of the units in the yoke and the compression of the units outside the draft pocket are relatively simple operations, the latter being easily performed by suitable apparatus, and the new device can accordingly be installed in a draft pocket quite as easily as a standard draft gear which the device is intended to replace.

The forms of the new apparatus shown in Figs. 24 to 31, inclusive, involve the use of a horizontal yoke for connecting the coupler and cushioning mechanism. In that form of the apparatus, illustrated in Fig. 24, the mechanism is shown installed in a standard draft pocket which lies between the longitudinal sills 97, 97 of the vehicle, although the pocket may be formed in any other suitable manner. The mechanism includes a horizontal yoke 98 lying within the pocket and the yoke includes front and rear end members 99 and 100, respectively, and side pieces 101 connected by a crossbar 102. The side pieces are relatively narrow as compared to the spacing of the sills, and the crossbar is only slightly less wide than that space. The parts of the crossbar 102 extending beyond the side pieces of the yoke are, therefore, preferably supported, as by means of webs 103 which extend from the side edges of the side pieces to the projecting portions of the crossbar. At its forward end, the yoke is provided with spaced arms 104 between which is received the shank 105 of the coupler 106, the rear end of the shank bearing against the forward face of the end member 99 of the yoke. The shank is secured to the arms 104 in any suitable manner, as by a key 107 passing through a slot in the shank, slots 108 in the arms 104, and slots 109 in cheek plates 110 attached to the sills 97, the slots 109 being of considerable length to permit a substantial lengthwise movement of the coupler.

Within the yoke are a pair of cushioning units, generally designated 111 and 112, which may be of various constructions. For example, the units may take the form of friction draft gears, which include friction elements in the form of wedges, shoes, or the like, acted on by springs, or they may consist of springs, or combinations of plates and coil springs, or they may include resilient material, such as rubber. Cushioning units which include rubber are preferred, and in the construction illustrated, each unit includes a plurality of alternately arranged rubber-bearing and separator plates of sheet metal 113a and 113b, respectively. Each plate 113a carries masses of rubber on its opposite faces mounted in any suitable manner, as, for example, in the form of a plurality of concentric rings of rubber 114, secured on each face of the plate by tongues 115 (Fig. 31) which pass through openings in the plate and connect corresponding rings on the opposite faces thereof.

Figures 24, 25:
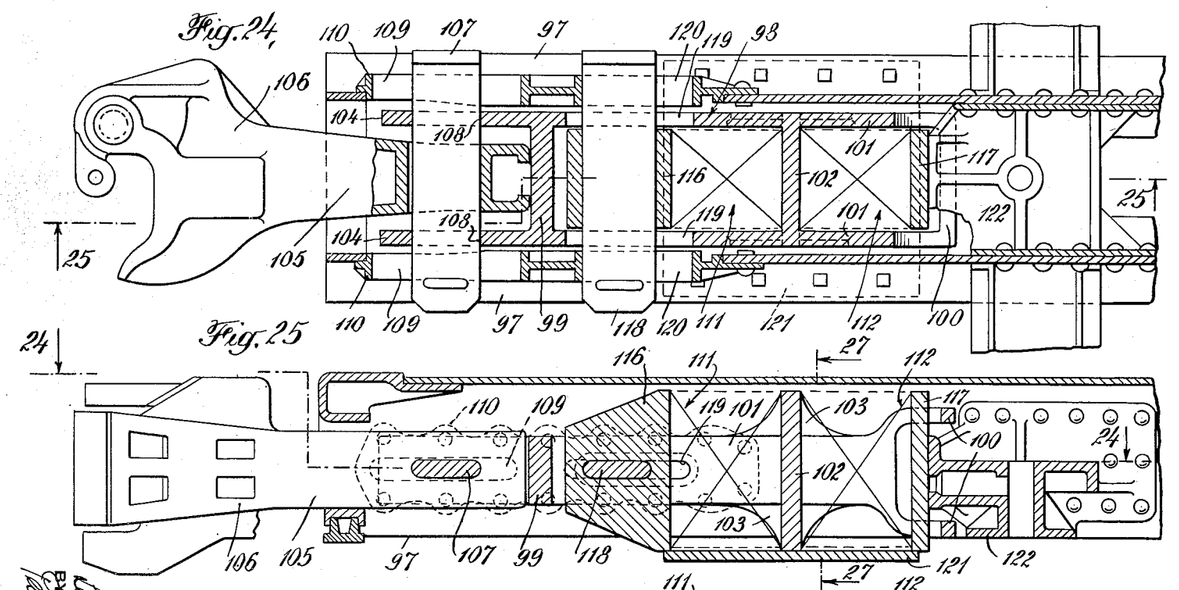
Fig. 24 is a longitudinal sectional view, partly in plan, showing another form of the new apparatus, the section being along the line 24—24 of Fig. 25.
Fig. 25 is a sectional view on the line 25—25 of Fig. 24.
Figure 26:
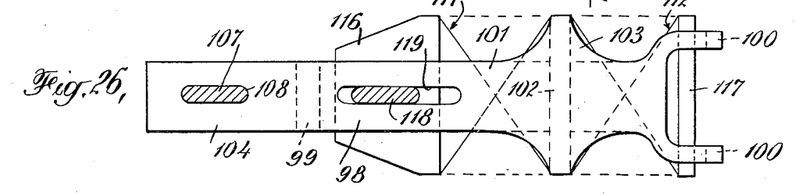
Fig. 26 is a side view of a yoke used in the apparatus of Fig. 24.

At the adjacent ends of the units, the end separator plates bear against the crossbar 102, and at their remote ends, the units are provided with front and rear followers 116 and 117, respectively. The front follower 116 is secured within the yoke in any suitable manner, as by a key 118 passing through a slot in the follower, slots 119 in the side pieces of the yoke, and slots 120 in the cheek plates 110, the slots 119 and 120 being of a considerable length to permit a substantial lengthwise movement of the key and follower in buff. The mechanism is supported in the pocket by a carry iron 121 with the rear follower seated against the usual back stop and center filler casting 122, the end member 100 of the yoke being bifurcated so as to straddle the forward end of the back stop without contacting therewith.

In the apparatus, the cushioning units are preferably installed under such effective compression that each unit has an expansivity at least as great as the amplitude of movement of the coupler and yoke against the resistance of the other unit, under normal operating conditions. Each unit thus makes substantially continuous contact at one end with the crossbar 102 of the yoke and the other end, the rear unit engages the front face of the back stop which serves as an abutment, while the forward unit engages the key. As the key is held against the front ends of the slots 120 in the cheek plates by the unit when the latter is being compressed, the key and slots provide an abutment against which the forward unit may be compressed.

In order that the apparatus may be installed in the pocket with the units under the effective compression referred to, the cushioning elements are assembled in the yoke, placed under the desired compression by suitable apparatus, and then held in this condition by temporary holding means, such as bars of wood 123 inserted between the front and rear followers and the front and rear end members of the yoke, respectively. In that condition of the parts, the distance between the forward edge of key 118 and the rear face of follower 117 is less than the distance between the forward ends of the slots 120 and the front face of the back stop 122. The yoke with the units in position may then be raised into the pocket from beneath, the carry iron may be placed in position and the coupler shank connected to the yoke.

The temporary holding means remain in position only until forces are applied to the coupler. Thus, when the coupler is subjected to a force in buff, the yoke moves back until the rear follower engages the back stop, whereupon, upon further movement of the yoke, the rear holding means are released and drop out. The front holding bar is released in a similar manner when the coupler and yoke are drawn forward by a force in draft.

In the operation of the apparatus described, upon the application of a force in buff to the coupler, the coupler and yoke are moved to the rear and the yoke crossbar compresses the rear cushioning unit 112 against the back stop, while the forward unit is permitted to expand. If, with the apparatus in this condition, the force is removed or its direction is changed, the yoke moves forward, and the crossbar begins to compress the forward unit 111 against the key 118, which is held fast against the front ends of the slots 120 in the cheek plates. When the coupler is subjected to a force in draft, the forward unit is compressed against the key, while the rear unit expands. Thus, under all conditions encountered in normal operation, one or the other of the units comes into action to resist coupler and yoke movements, and such movements are cushioned and controlled.

Figures 27, 28, 29, 31:
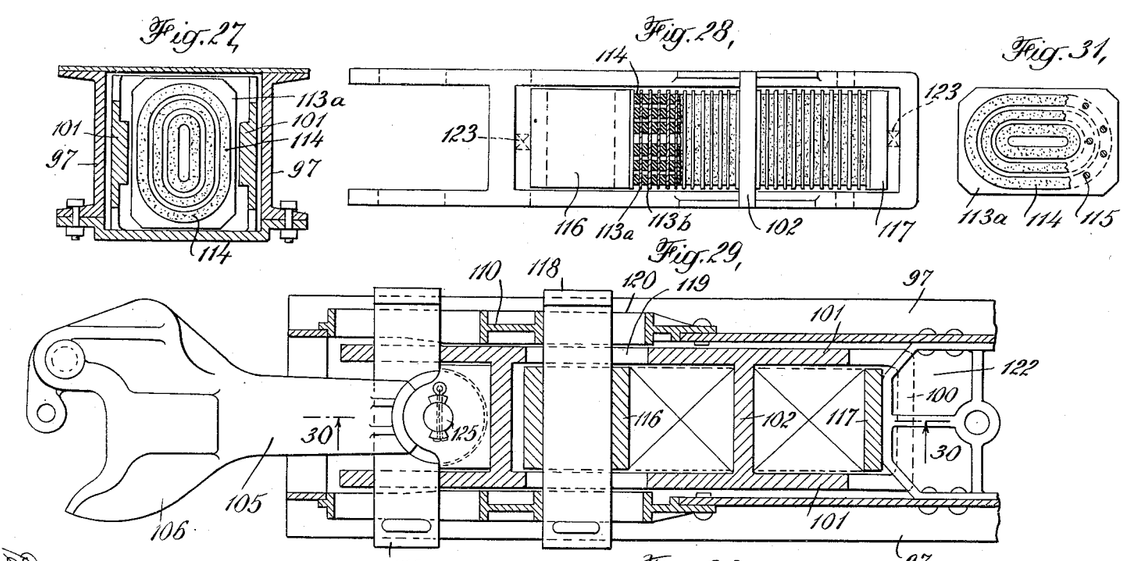
Fig. 27 is a sectional view on the line 27—27 of Fig. 25.
Fig. 28 is a plan view, partly in section, of parts of the apparatus.
Fig. 29 is a longitudinal sectional view, similar to Fig. 24 of a modified form of the apparatus.
Fig. 31 is an elevation of an element of the apparatus with parts broken away.
Figure 30:
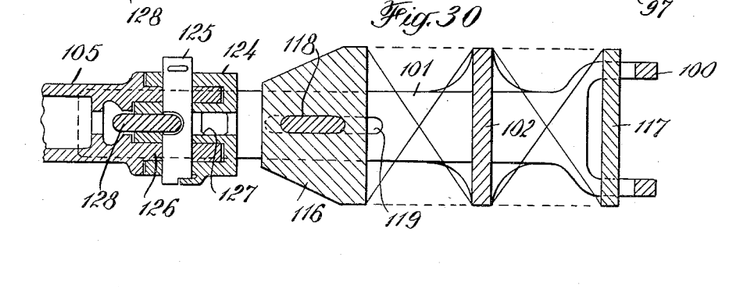
Fig. 30 is a sectional view on the line 30—30 of Fig. 29.

It may be desirable in some cases to employ a form of apparatus which allows a swivel action of the coupler, and such an apparatus is shown in Figs. 29 and 30. In this construction, the cushioning units are the same as those previously described, but the front end member of the yoke has been omitted from Fig. 30. The shank 105 of the coupler 106 is connected to a swivel block 124 by a pin 125 passing through tongues 126 on the shank and tongues 127 on the block, and the shank and block are slotted to receive a key 128 which passes through slots in the arms of the yoke and in the cheek plates, as in the construction previously described.

This application is a continuation-in-part of each of my applications Serial No. 120,019, filed January 11, 1937 and Serial No. 129,349, filed March 6, 1937.

I claim:

1. In a railway vehicle, the combination with a draft pocket having spaced stops therein, of a pair of cushioning units lying in line within the pocket with their remote ends in contact with the stops, each unit comprising alternate rubber-bearing and spacer plates lying in face to face contact, a yoke encircling both units and having longitudinal pieces extending along the outer edges of the units, lugs on the edges of the plates engageable with opposite sides of the longitudinal yoke pieces to prevent lateral movement of the plates relative to said pieces, a crossbar connecting the pieces and lying between and in contact with the adjacent ends of the units, the units being confined longitudinally only by the crossbar and their associated stops and being installed under substantial initial compression, whereby the units operate in alternation with one unit expanding as the other is compressed during movement of the yoke, and a coupler having a shank attached to the yoke.

2. In a railway vehicle, the combination with a draft pocket having spaced stops therein, a pair of friction draft gears lying end to end within the pocket with their remote ends in contact with the stops, a yoke encircling both units and having a portion thereof which is movable with the yoke and lies between and in contact with the adjacent ends of the units, said yoke having end members lying out of contact with the units, and a coupler having a shank attached to the yoke, said units being longitudinally confined only by said portion of the yoke and said stops, and being installed under substantial initial compression whereby one unit expands as the other is compressed upon the application of forces to the coupler.

3. In a railway vehicle, the combination with a draft pocket having spaced stops therein, of a pair of cushioning units lying in line within the pocket with their remote ends in contact with the stops, a yoke encircling both units and having a portion thereof which is movable with the yoke and lies between and in contact with the adjacent ends of the units, the end members of the yoke being out of contact with the units, and said units being installed under substantial compression and being longitudinally unconfined except by the stops and said portion, whereby the units operate in alternation with one unit expanding as the other is compressed during movement of the yoke, and a coupler having a shank attached to the yoke.

4. In a railway vehicle, the combination of a pair of spaced sills, stops attached to the sills and with the latter defining a draft pocket, a pair of cushioning units lying in line within the pocket with their remote ends in contact with the stops, a yoke encircling both units and having a portion which is movable with the yoke and lies between and in contact with the adjacent ends of the units, the ends of the yoke being out of contact with the remote ends of the units, and said units being installed under substantial compression and being longitudinally unconfined except by the stops and said portion, whereby the units operate in alternation with one expanding as the other is compressed by said portion against its stops during movement of the yoke, and a coupler having a shank attached to the yoke.

5. In a railway vehicle, the combination with a draft pocket having spaced stops therein, of a pair of cushioning units lying in line within the pocket with their remote ends in contact with the stops, each unit comprising alternate rubber-bearing and spacer plates lying in face to face contact, a yoke encircling both units and having a portion which is movable with the yoke and lies between and in contact with the adjacent ends of the units, the ends of the yoke being out of contact with the units, and said units being installed under substantial compression and being longitudinally unconfined except by the stops and said portion, whereby the units operate in alternation with one expanding as the other is compressed during movement of the yoke, and a coupler having a shank attached to the yoke.

6. In a railway vehicle, the combination of a pair of spaced sills, stops attached to the opposed faces of the sills and arranged to define a draft pocket at each end of which are a pair of stops, a pair of cushioning units lying end to end in line within the pocket with their remote ends in contact with the stops, a yoke encircling both units and comprising longitudinal members and end members extending along the sides and across the ends, respectively, of the units, said end members lying out of contact with the remote ends of the units, a crossbar connecting the longitudinal members of the yoke and lying between and in contact with the adjacent ends of the units, said units being longitudinally unconfined except by the stops and said crossbar, and installed under substantial initial compression, whereby the units operate in alternation with one unit free to expand as the other is compressed during the movement of the yoke, and a coupler having a shank attached to the yoke.

7. In a railway vehicle, the combination with a draft pocket having spaced stops therein, of a pair of cushioning units lying in line within the pocket and provided with followers at their remote ends, said followers having lugs projecting from one face thereof and contacting with the associated stops, a yoke encircling both units and having a crossbar lying between and in contact with the adjacent ends of the units, and end members extending across and out of contact with the followers, said units being installed under substantial compression and being longitudinally unconfined except by the crossbar and their associated stops, whereby the units operate in alternation with one unit expanding as the other is compressed during movement of the yoke, and a coupler having a shank attached to the yoke.

8. In a railway vehicle, the combination of a pair of spaced, parallel walls extending longitudinally of the vehicle, a cushioning mechanism mounted between said walls and including a pair of cushioning units in line, said units being provided with followers at the remote ends thereof, the follower for the forward unit being slotted, a back stop mounted between the walls and in contact with the follower of the rear unit, a key passing through the slot of the follower of the front unit and operatively connected to said walls to constitute an abutment for the front unit, a horizontal yoke enclosing said units and having a crossbar which is movable with the yoke and lies between and in contact with the adjacent ends of the units, said units being longitudinally confined only by the crossbar, back stop, and key, and being installed under substantial initial compression, whereby the units operate in alternation with one free to expand as the other is compressed, and a coupler operatively connected to the yoke.

9. In a railway vehicle having a pair of spaced, parallel walls extending longitudinally of the vehicle, the combination of a pair of cushioning units lying in line between the walls, a horizontal yoke encircling the units and having a transverse portion which is movable with the yoke and lies between and in contact with the adjacent ends of the units, abutment means engaging the remote ends of the units, the ends of the yoke being out of contact with said remote ends of the units and said units being installed under substantial compression and being longitudinally unconfined except by the abutment means and said transverse portion, whereby the units operate in alternation with one unit expanding as the other is compressed and the units maintaining continuous contact with said transverse portion and their associated abutment means under ordinary operating conditions, and a coupler having a shank attached to the yoke.

10. In a railway vehicle having a pair of longitudinal sills, the combination of a pair of cushioning units lying in line between the sills, a horizontal yoke encircling the units and having a transverse portion which is movable with the yoke and lies between and in contact with the adjacent ends of the units, the ends of the yoke being out of contact with the remote ends of the units, abutments engaged by the remote ends of the units, one of said abutments being a back stop and center filler casting lying between and secured to the sills, said units being longitudinally unconfined except by the abutments and said transverse portion and installed under substantial initial compression, whereby the units operate in alternation with one unit free to expand as the other is compressed during movement of the yoke, and a coupler operatively connected to the yoke.

11. In a railway vehicle having a pair of center sills and a back stop and center filler casting lying between and secured to the sills, the combination of a pair of cushioning units lying in line between the sills, a key having ends received in slots in the sills and engaged by the forward end of the front unit, the rear end of the back unit abutting against said casting, a horizontal yoke encircling the units and having end members out of contact with the units, and a crossbar which is movable with the yoke and lies between and engages the adjacent ends of the units, said units being longitudinally unconfined except by the crossbar, key, and casting and being installed under substantial initial compression, whereby the units operate in alternation with one unit free to expand as the other is compressed during movement of the yoke, and a coupler having a shank operatively connected to the yoke.

12. In a railway vehicle having a pair of center sills and a back stop and center filler casting lying between and secured to the sills, the combination of a pair of cushioning units lying in line between the sills, a key having ends received in slots in the sills and engaged by the forward end of the front unit, the rear end of the back unit abutting against said casting, a horizontal yoke encircling the units and having end members out of contact with the units, one of said end members being bifurcated and straddling a portion of said casting without contacting with the latter, and a crossbar which is movable with the yoke and lies between and engages the adjacent ends of the units, said units being longitudinally unconfined except by the crossbar, key, and casting and being installed under substantial initial compression, whereby the units operate in alternation with one unit free to expand as the other is compressed during movement of the yoke, and a coupler having a shank operatively connected to the yoke.

13. In a railway vehicle having a pair of spaced, parallel walls extending longitudinally of the vehicle, the combination of a cushioning mechanism including a pair of cushioning units lying end to end in line between the walls, each unit comprising a plurality of alternately arranged rubber-bearing and separator plates, abutment means disposed at the remote ends of the units in the space between the walls, a horizontal yoke encircling the units, said yoke having a transverse portion movable therewith and lying between and in contact with the adjacent ends of the units, each of said units being confined at one end only by the abutment means and at the other end only by said transverse portion and said units being installed under compression, whereby said units operate in alternation with one unit free to expand as the other is compressed during movement of the yoke, and a coupler operatively connected to the yoke.

LEVERETT M. CLARK.